UNITED STATES PATENT OFFICE.

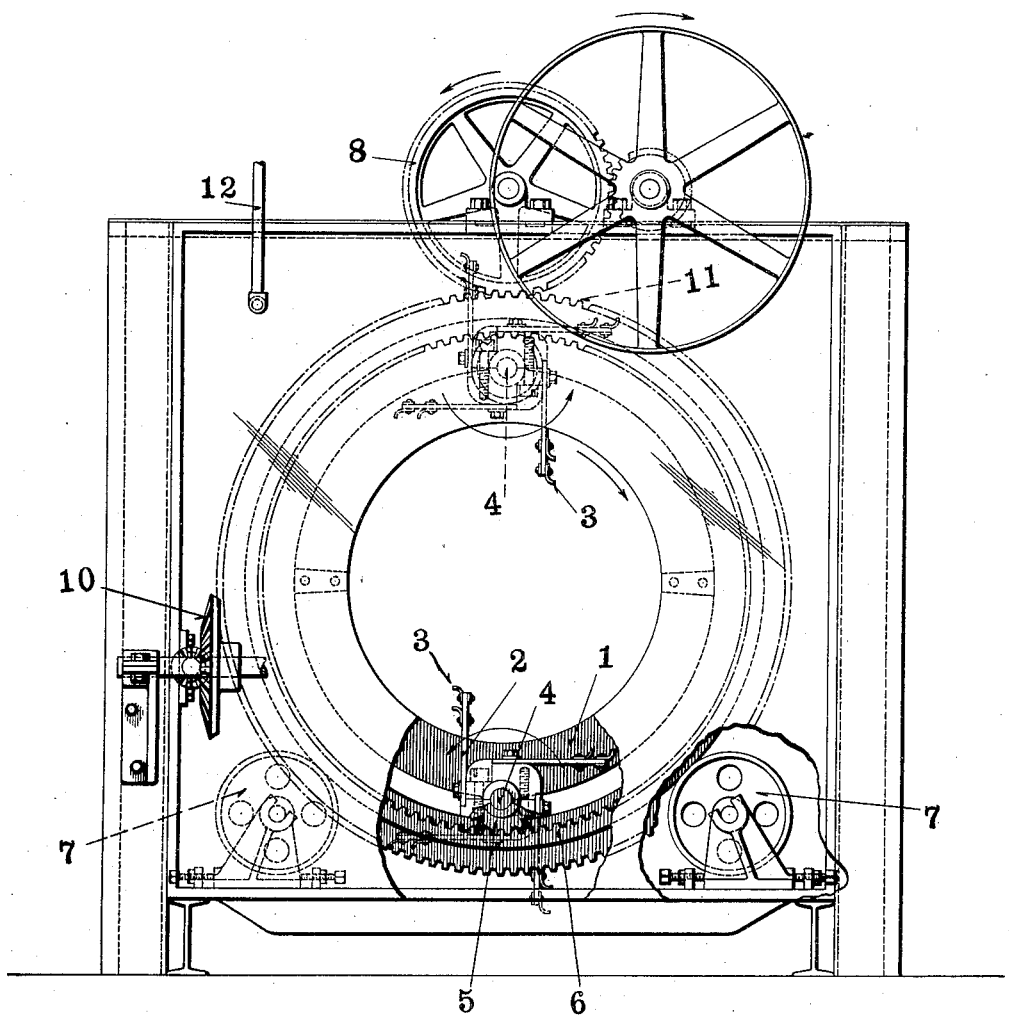

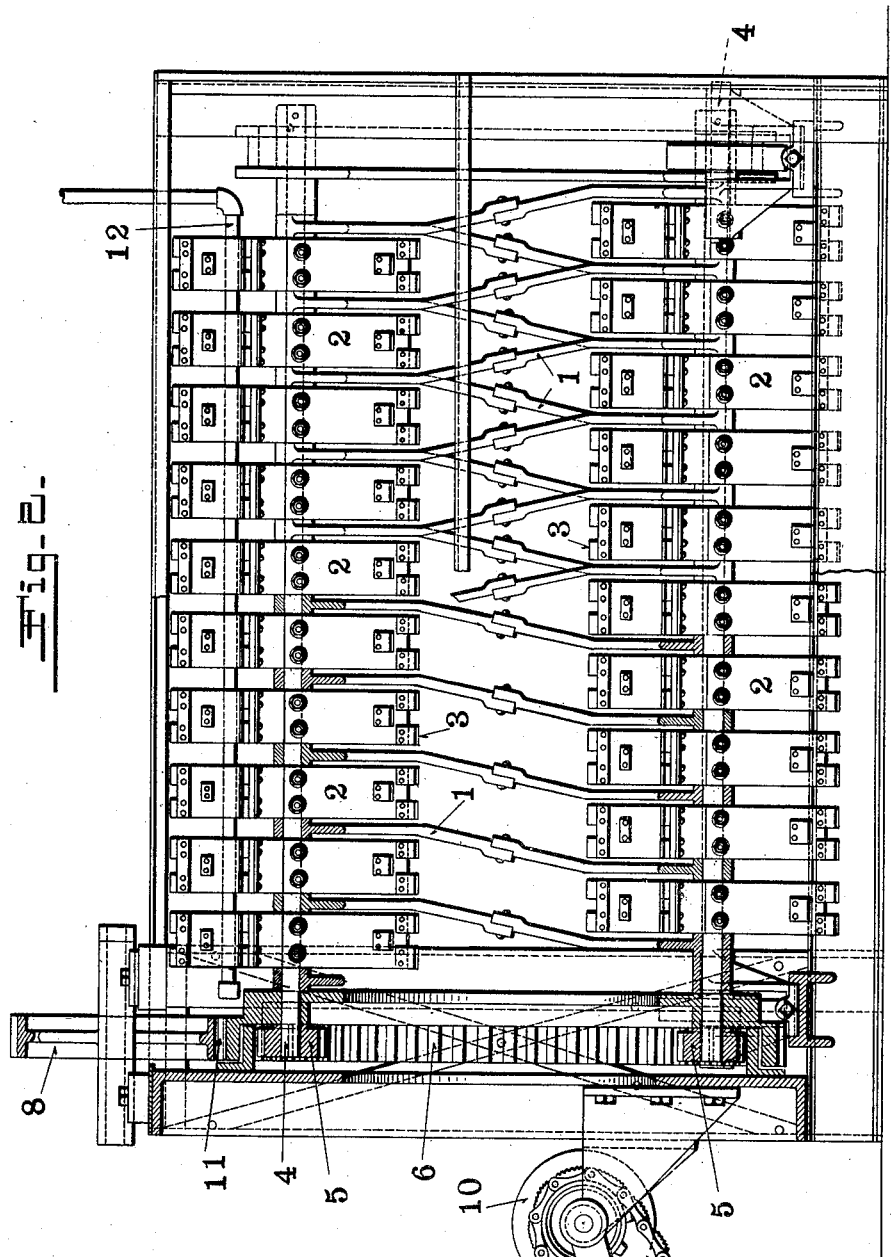

FRANK V. BRECHT AND HELMUTH W. TOHTZ, OF ST. LOUIS, MISSOURI, ASSIGNORS TO THE GUS V. BRECHT BUTCHERS' SUPPLY COMPANY, OF ST. LOUIS, MISSOURI, A CORPORATION OF MISSOURI.

CARCASS SCRAPING AND POLISHING MACHINE.

1,350,435.   Specification of Letters Patent.   Patented Aug. 24, 1920.

Application filed October 2, 1918, Serial No. 256,604. Renewed January 29, 1920. Serial No. 354,874.

*To all whom it may concern:*

Be it known that we, FRANK V. BRECHT and HELMUTH W. TOHTZ, citizens of the United States of America, residing at the city of St. Louis, State of Missouri, United States of America, have invented a certain new and useful Carcass Scraping and Polishing Machine, of which the following is such a full, clear, and exact description as will enable any one skilled in the art to which it appertains to make and use the same, reference being had to the accompanying drawings, forming part of this specification.

Our invention relates to an improved carcass scraping and polishing machine in which the carcass is loosely supported, rotated and advanced while being operated upon by scraping and polishing apparatus, and more particularly to a machine of the character indicated in which the conveyer has substantially the shape of a hollow cylinder within and through which the carcass is supported and conveyed.

In prior forms of scraping machines having hollow cylindrical conveyers, it has sometimes been found difficult to discharge the removed hair from the cylinder and prevent its collecting in the interior thereof and interfering with the proper operation of the machine. One of the objects of our invention is to overcome this difficulty. Another object is to so arrange the scraping mechanism with respect to the conveyer that the portion of the body of the carcass upon which the scraping mechanism operates has a predetermined relation to the axis of this mechanism regardless of the shape or size of the carcass, whereby efficient cleaning of all parts of the carcass may be secured without subjecting any part thereof to excessive blows or pressure of the scraping devices. Other objects and advantages will appear from the following detailed description.

In the accompanying drawings, Figure 1 is an end view of a carcass scraping machine embodying our invention, certain parts being broken away. Fig. 2 is a side view of the machine partly in elevation and partly in section.

In the form illustrated the carcass conveyer comprises a plurality of semicircular members 1 having their ends offset as shown and joined together to form substantially a spiral conveyer with unobstructed spaces between the turns thereof. As shown in the drawing, all of the central portion of each member 1 lies in a single plane and spaces are thus formed between adjacent turns of the spiral through which the scraping mechanism may revolve. This scraping mechanism may be of any desired and convenient form and in the apparatus illustrated comprises a plurality of flexible members 2 constructed of heavy canvas or other suitable material and provided at the outer end with metal scraping devices 3. These flexible members are attached to the shafts 4 which are rotated by means of the pinions 5 engaging with the stationary gear 6, the shafts 4 being mounted on the conveyer 1 which is supported on the laterally adjustable trunnions 7 and is driven from a suitable source of power through the gear 8 mounted on a suitable framework and the gear 11 which is attached to the conveyer.

Carcasses are delivered to the interior of the machine by means of an endless conveyer 9 driven by the gearing 10. Through perforated pipes 12 water is sprayed on the carcass as it passes through the machine.

Referring to the operation of the apparatus in cleaning and polishing carcasses of hogs, the carcass after passing through a suitable scalding vat is delivered to the interior of the rotating spiral conveyer and lies in the lower portion thereof. The rotation of the conveyer causes the carcass to be rotated and it is advanced by the forwardly inclined portions of the conveyer turns when they come into contact with it. The shafts carrying the scraping mechanism are carried with the conveyer during its rotation and during two periods in each rotation of the conveyer the scraping devices actuated by these shafts strike the lower portion of the carcass as indicated on the drawing; the direction of this contact is such that the scrapers coöperate with the conveyer in turning the carcass to bring all parts into operative relation with the scrapers. The axis of the conveyer may be horizontal or slightly inclined with the delivery end lowest.

It will be noted that in the machine described there is a predetermined relation between the carcass and the flexible members which carry the scrapers, regardless of the size and shape of the carcass, a condition which does not exist in prior machines in which the scraping devices are carried on the shaft positioned in the center of a cylindrical conveyer. It is accordingly possible with our machine to provide for sufficient contacting force of the scrapers to thoroughly clean all parts of the carcass regardless of its size and shape without at any time subjecting any part thereof to excessive blows which would tend to mar or injure it.

Having fully described our invention, what we claim as new and desire to secure by Letters Patent of the United States is:

1. In a carcass scraping and polishing machine, the combination of a rotatable member for supporting and advancing the carcass, carcass scraping devices supported on the periphery of the rotatable member and means for actuating said devices independently of the motion imparted to them by the rotatable member.

2. In a carcass scraping and polishing machine, the combination of a rotatable member for advancing the carcass, a shaft mounted on the periphery of the rotatable member, carcass scraping devices on said shaft, and means for rotating the shaft.

3. In a carcass scraping and polishing machine, the combination of a rotatable hollow conveyer in the form of a continuous spiral having lateral openings between the turns of the spiral and carcass scraping devices adapted to contact with the carcass through said openings.

4. In a carcass scraping and polishing machine, the combination with scraping mechanism of a conveyer for supporting and advancing a carcass in operative relation with the scraping mechanism, said scraping mechanism being mounted on the conveyer and said conveyer being in the form of a continuous spiral within which the carcass is supported and having unobstructed spaces between the turns of the spiral whereby removed hair may be laterally discharged from the conveyer.

5. In a carcass scraping and polishing machine, the combination of a plurality of spaced carcass supporting members connected to form a hollow spiral conveyer, a rotatable shaft supported on the periphery of said conveyer, scraping devices actuated by said shaft, means for delivering carcasses to the interior of the conveyer, and means for rotating the conveyer.

6. In a carcass scraping and polishing machine, the combination of a rotatable hollow conveyer, a plurality of shafts mounted thereon, a cylindrical stationary rack, pinions fixed to the shafts and engaging with said rack, carcass scraping devices on said shaft, and means for rotating the conveyer.

In testimony whereof, we have hereunto set our hands and affixed our seals.

FRANK V. BRECHT. [L. S.]
HELMUTH W. TOHTZ. [L. S.]